May 19, 1942.  W. O. BUNDY, JR., ET AL  2,283,534
ELECTRICAL SWITCH
Original Filed May 6, 1941

Inventor
W. O. Bundy, Jr.
C. S. Lewis
I. Erlich
By Mason Fenwick & Lawrence
Attorneys Patented May 19, 1942

2,283,534

UNITED STATES PATENT OFFICE 2,283,534

ELECTRICAL SWITCH

William Oliver Bundy, Jr., Charles Sinclair Lewis, and Isidore Erlich, El Paso, Tex.

Application May 6, 1941, Serial No. 392,140

5 Claims. (Cl. 200—58)

This invention relates to electrical switches and is a continuation in part of applicant's copending application, Ser. No. 284,974, filed July 17, 1939.

The invention more particularly relates to an electrical switch for use in connection with automobile wheels to complete circuits responsive to variations in tire pressure.

An object of the invention is to provide an improved and simplified switch easily applied to a vehicle rim and having a minimum number of parts.

A further object of the invention is to provide a switch of the type indicated capable of easy adjustment to modify the pressure range within which the switch is operated.

Further objects will more particularly appear in the course of the following detailed description.

One sheet of drawings accompanies this specification as part thereof, in which like reference characters indicate like parts throughout.

Figure 1:
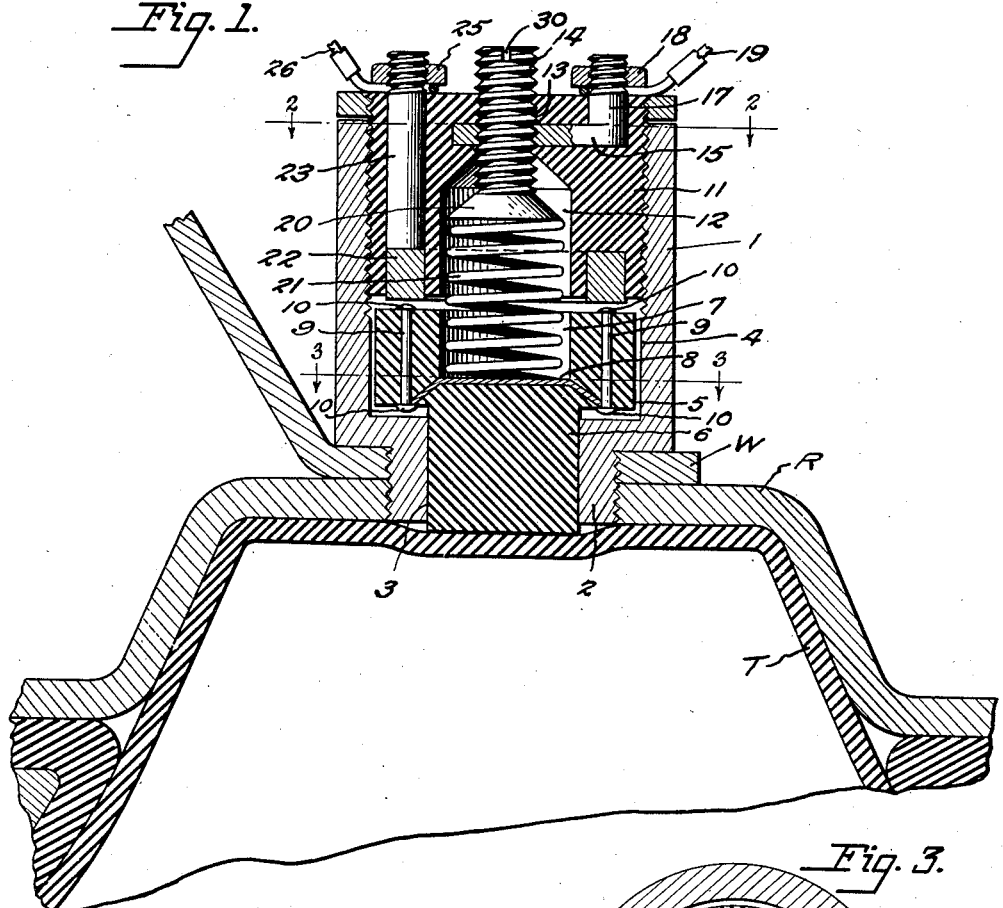
Figure 1 is a transverse cross section taken through an improved switch as applied to a vehicle rim and wheel, a fragment only of the latter being shown.
Figure 2:
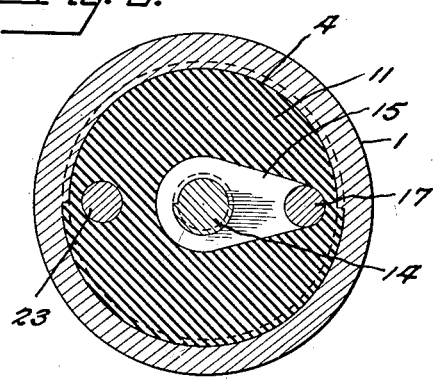
Figure 2 is a transverse cross section taken on line 2—2 of Figure 1.
Figure 3:
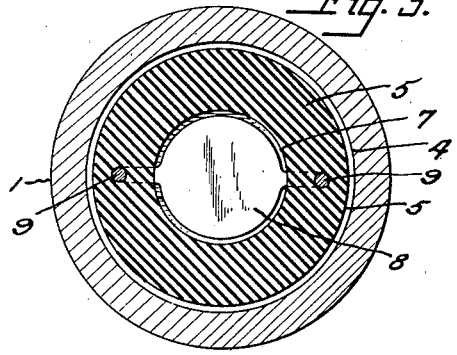
Figure 3 is a transverse cross section taken on line 3—3 of Figure 1.

In accordance with the present invention a body 1, herein illustrated as of cylindrical shape, is provided and preferably formed of a good electrical conductor metal such as copper or brass and this body is formed with a reduced end portion 2 externally threaded to be secured in an internally threaded hole provided in the hub flange W and the wheel rim R. The body 1 is provided with an axial bore 3 which is enlarged within the main body to form a bore 4 interiorly threaded for a portion of its length. Within the body are positioned two members preferably formed of dielectric material, one of which, 5, is formed with a portion conforming to the enlarged bore 4 of the body 1 and an extension 6 of reduced diameter adapted to have a sliding fit in the reduced bore 3 and project beyond the end of same to contact a tire T. This slidable member 5 is provided on its inner end with a cavity 7 through which passes a conductor member 8, the ends of which extend to form electrical contact with two or more conductor pins 9 having contact heads 10 exposed on their opposite ends.

A second dielectric member 11 is externally screw-threaded to be seated in association with the internal threads of body 1 and this member is provided with a cavity 12 in axial alignment with the cavity 7 of the slidable dielectric member. The member 11 is further provided with an internally threaded orifice 13 in axial alignment with the cavity 7 and cavity 12 adapted to receive a threaded conductor screw 14 provided with a screw driver slot 30 on its outer end for adjustment purposes. An L-shaped conductor member 15 provided near one end with an internally threaded hole adapted to receive adjustment member 14 and on its other end externally threaded to receive a binder post nut 18 is embedded in member 11 to provide a circuit through the adjustment screw 14. The inner end of adjustment screw 14 is provided with an enlarged spring seat 20 and a compression spring of conductive material is positioned between the spring seat 20 and the conductor member 8. A conductor 22 herein shown as of ring shape is embodied in member 11 having one face exposed on the lower face of that member and connected by a conductor post 23 which extends beyond the outer end of body 11 and is externally threaded to receive a binder post nut 25. A conductor 19 may be associated with the binder post 17 and a conductor 26 associated with the binder post 23 while it will be apparent that the body 1 will provide electrical circuit means through the hub rim W and wheel rim R as desired.

With the structure as thus described, it will be apparent that the dielectric member 5 is slidable within body 1 in response to fluctuations in pressure of tire tube T, the range of such fluctuations being determined by the extent to which screw 14 is turned in or out with corresponding compression of the spring 25. When the pressure in tire T overcomes the pressure of spring 21, member 5 will rise in body 1 and the upper contact heads 10 will engage conductor ring 22, thus completing a circuit from wire 19 through conductor 15, adjustment screw 14, spring 21, conductor 8, conductors 9, conductor ring 22, binder post 23 and wire 26.

When, on the other hand, the pressure in tire T becomes less than the pressure exerted by spring 21, member 5 will slide outwardly with respect to body 1 and the lower or opposite contact heads 10 will engage body 1 thus completing an electrical circuit from wire 19 through conductor 17, conductor 15, adjustment screw 14, spring 21, conductor 8, the lower contact heads 10 of conductors 9, body 1 and wheel rim R.

Various modifications in the precise construction and arrangements of the parts will readily suggest themselves to those skilled in the art but within the scope of the present invention as claimed.

What we claim is:

1. A pressure responsive electric switch comprising a conductive body having a through bore and means for securing it in operative relation to a pressure containing body, two dielectric members, one fixedly secured in one end of the bore and the other slidable in and extending silghtly beyond the other end of the bore, two conductor members extending through the fixed dielectric member, conductive means carried by the slidable dielectric member always in electrical contact with one of the conductors in the fixed member and arranged to alternatively contact the conductive body and the other conductor in the fixed member at opposite ends of the stroke of the slidable dielectric member and means normally forcing the two dielectric members apart.

2. The device of claim 1 in which the means forcing the two dielectric members apart comprises a spring which electrically connects the conductor in the slidable dielectric member with one of the conductors in the fixed dielectric member at all times.

3. The device of claim 1 in which the means forcing the two dielectric members apart comprises a spring one end of which engages the conductor in the movable dielectric member and one of the electrical conductors in the fixed dielectric member includes a part axially adjustable with respect to the bore and engages the other end of the spring whereby the tension on the slidable dielectric member can be modified.

4. The device of claim 1 in which the dielectric members are provided with facing cavities in which a compression spring is positioned, one of the conductors in the fixed dielectric member includes a screw threaded stud extending through the dielectric member and having on its inner end a head engaging one end of the spring and a binding post extension therefrom, the other conductor in the fixed dielectric member extends therethrough having binding post means on its outer end and its inner end exposed as a contact facing the slidable dielectric member and the conductor in the sliding dielectric member includes a portion passing through the cavity in said member against which the other end of the spring seats and a portion having its opposite ends aligned with the inner contact end of the second mentioned conductor of the fixed dielectric member and a portion of the conductor body substantially as specified.

5. A pressure responsive electric switch comprising a body having a bore and means for securing it in operative relation to a pressure containing body, a member slidable axially in the bore and projecting slightly beyond the end thereof to contact the pressure containing body, a conductor member axially adjustable with respect to the body in alignment with and spaced from the slidable member, a compression spring positioned between the adjustable member and the slidable member, a fixed electrical conductor insulated from but carried by the body having a contact face directed toward the inner end of the slidable member, and electrical conductors carried by the slidable member insulated with respect to that member and having a plurality of contact faces, one for the conductor carried by the body and one oppositely disposed with means for grounding the latter through the body.

WILLIAM OLIVER BUNDY, Jr.
CHARLES SINCLAIR LEWIS.
ISIDORE ERLICH.